(12) United States Patent
Setoyama (10) Patent No.: US 9,394,958 B2
(45) Date of Patent: Jul. 19, 2016

(54) VIBRATION DAMPING DEVICE

(71) Applicant: TOKAI RUBBER INDUSTRIES, LTD., Komaki-shi, Aichi (JP)

(72) Inventor: Toyoshi Setoyama, Nagoya (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 71 days.

(21) Appl. No.: 14/283,684

(22) Filed: May 21, 2014

(65) Prior Publication Data

US 2015/0061202 A1 Mar. 5, 2015

Related U.S. Application Data

(63) Continuation of application No. PCT/JP2013/005087, filed on Aug. 28, 2013.

(51) Int. Cl.
*F16F 13/10* (2006.01)
*F16F 3/087* (2006.01)
(Continued)

(52) U.S. Cl.
CPC .......... *F16F 3/0873* (2013.01); *F16F 1/36* (2013.01); *F16F 13/10* (2013.01); *F16F 13/103* (2013.01); *F16F 15/08* (2013.01)

(58) Field of Classification Search
CPC .......... F16F 1/36; F16F 13/103; F16F 13/08; F16F 13/10; F16F 15/08; F16F 2226/04; B60K 5/1208
USPC ............... 267/140.11, 140.13, 140.3, 141
See application file for complete search history.

(56) References Cited

U.S. PATENT DOCUMENTS 3,671,065 A * 6/1972 Bingham ............ E05C 1/10
292/175
5,127,698 A * 7/1992 Konig ............ B60G 99/004
248/635
(Continued)

FOREIGN PATENT DOCUMENTS

| JP | A-2008-002565 | 1/2008 |
| JP | A-2008-248898 | 10/2008 |
| JP | A-2010-174957 | 8/2010 |

OTHER PUBLICATIONS

Oct. 1, 2013 International Search Report issued in International Patent Application No. PCT/JP2013/005087 (with English Translation).

(Continued)

*Primary Examiner* — Thomas Irvin
(74) *Attorney, Agent, or Firm* — Oliff PLC (57) ABSTRACT

A vibration damping device including a first mounting member and a second mounting member elastically connected by a main rubber elastic body, and a separate stopper member positioned in a housing recess that is formed by a cylindrical portion of the second mounting member and that opens in an axial direction. An elastic tapered portion equipped with a contact surface that inclines gradually to an inner circumferential side toward an open side of the housing recess is provided at an inner circumferential surface of the cylindrical portion which constitutes a peripheral wall of the housing recess, and a stopper protrusion projecting outward in an axis-perpendicular direction is provided to the stopper member. The stopper protrusion is positioned further inside the housing recess than the elastic tapered portion and the stopper protrusion overlaps the elastic tapered portion when viewed in axial direction projection.

6 Claims, 8 Drawing Sheets

(51) Int. Cl.
*F16F 15/08* (2006.01)
*F16F 1/36* (2006.01)

(56) References Cited

U.S. PATENT DOCUMENTS

| | | | | |
|---|---|---|---|---|
| 6,592,285 B1* | 7/2003 | Schwarz | ................ | F16F 15/08 |
| | | | | 248/632 |
| 7,207,552 B2* | 4/2007 | Bregeault | ................ | F16F 13/08 |
| | | | | 267/140.13 |
| 7,293,755 B2* | 11/2007 | Miyahara | ................ | F16F 13/16 |
| | | | | 248/560 |
| 7,611,288 B2* | 11/2009 | Lew | ................ | B60K 17/24 |
| | | | | 29/898.07 |
| 7,810,797 B2* | 10/2010 | Minamisawa | ....... | B60K 5/1208 |
| | | | | 267/140.13 |
| 2010/0264570 A1* | 10/2010 | Thierry | ................ | F16F 1/36 |
| | | | | 267/141 |
| 2013/0038006 A1* | 2/2013 | Saito | ................ | F16F 13/1463 |
| | | | | 267/140.13 |
| 2015/0192189 A1* | 7/2015 | Hermann | ............ | F16F 13/1481 |
| | | | | 267/140.13 |

OTHER PUBLICATIONS

Oct. 1, 2013 Written Opinion issued in PCT/JP2013/005087.

* cited by examiner

VIBRATION DAMPING DEVICE

INCORPORATED BY REFERENCE

This is a Continuation of International Application No. PCT/JP2013/005087 filed on Aug. 28, 2013, the disclosure of which including the specification, drawings and abstract is incorporated herein by reference in its entirety.

BACKGROUND OF THE INVENTION

1. Field of the Invention

This invention relates to vibration damping devices used in automotive engine mounts, etc., and especially to those vibration damping devices that are equipped with a separate stopper member that limits the amount of relative displacement in the axis-perpendicular direction of the first mounting member and the second mounting member.

2. Description of the Related Art

Conventionally, a vibration damping device is known as a kind of vibration damping connector or vibration damping support that is placed between the components that make up the vibration transmission system and that provides a vibration damping connection between those components. This vibration damping device, for example as stated in Japanese Unexamined Patent Publication No. JP-A-2010-174957, features a structure that, through its main rubber elastic body, elastically connects a first mounting member that is configured to be attached to one side of the components that constitute the vibration transmission system and a second mounting member that is configured to be attached to the other side of the components that constitute the vibration transmission system.

A housing recess is also formed on the inner circumference of the second mounting member and a separate stopper member is positioned in the housing recess so that the amount of relative displacement in the axis-perpendicular direction of the first mounting member and the second mounting member is limited by contact via the stopper member.

With the vibration damping device described in JP-A-2010-174957, it is necessary to keep the stopper member from falling out of the housing recess in the vibration damping device before the device is installed on the vehicle, etc. Accordingly, in JP-A-2010-174957, the stopper member is situated in such a way that it is compressed against the inner circumferential surface of the housing recess, and held within that housing recess by the recovery force of the stopper member itself.

However, with the structure described in JP-A-2010-174957, since resistance of the stopper member to falling out of the housing recess is created through the frictional resistance based on the recovery force of the stopper member, there was still a concern of the stopper member falling out due to vibration during transport, etc. Also, if the stopper member is pressed against the inner circumferential surface of the housing recess in advance, there is a concern that a large dynamic spring constant will be produced in the axis-perpendicular direction of the overall vibration damping device by tightening in of the main rubber elastic body or by the spring component of the stopper member, and the vibration damping performance might thus deteriorate.

SUMMARY OF THE INVENTION

The present invention was established in view of the above background, and one object of the present invention is to provide a vibration damping device with a novel structure that is able to effectively obtain the targeted dynamic spring characteristics while stably retaining the stopper member in the housing recess of the main body of the vibration damping device even before the device is installed on a vehicle, etc.

The above and/or optional objects of this invention may be attained according to at least one of the following modes of the invention. The following modes and/or elements employed in each mode of the invention may be adopted at any possible optional combinations.

The first mode of the present invention provides a vibration damping device including: a first mounting member; a second mounting member having a cylindrical portion; a main rubber elastic body elastically connecting the first and second mounting members; and a separate stopper member positioned in a housing recess that is formed by the cylindrical portion of the second mounting member and that opens in an axial direction, wherein at least one elastic tapered portion that is equipped with a contact surface that inclines gradually to an inner circumferential side toward an open side of the housing recess is provided at an inner circumferential surface of the cylindrical portion which constitutes a peripheral wall of the housing recess, at least one stopper protrusion projecting outward in an axis-perpendicular direction is provided to the stopper member, and the stopper protrusion is positioned further inside the housing recess than the elastic tapered portion and the stopper protrusion overlaps the elastic tapered portion when viewed in axial direction projection.

With a vibration damping device that is given the structure in accordance with the first mode of the present invention, a separate stopper member is positioned in the housing recess, thus limiting the relative displacement of the first mounting member and the second mounting member by having the stopper protrusion of the stopper member contact the inner surface of the peripheral wall of the housing recess when an excessive load is applied in the axis-perpendicular direction. Through this, damage, etc., due to excessive deformation of the main rubber elastic body is prevented and improvement in durability is achieved.

Moreover, with the vibration damping device itself before installation on a vehicle, etc., by locking the stopper protrusion of the stopper member in contact with the elastic tapered portion of the housing recess in the axial direction, the stopper member can be prevented from falling out of the housing recess. Through this, the separate stopper member is held in the housing recess and prevented from separation even if a force acts upon that stopper member in the direction of falling out during storage and transport of the vibration damping device. In particular, the stopper protrusion on the stopper member can prevent the stopper member from falling out of the housing recess through the use of a simple structure.

Further, when the stopper member is situated inside the housing recess, the stopper protrusion is positioned further inside the recess than the elastic tapered portion. Accordingly, when installed on a vehicle, etc., with the stopper protrusion in the specified position within the housing recess, the stopper protrusion does not press against the inner surface of the peripheral wall of the housing recess. Thus, it is possible to prevent the spring characteristics in the axis-perpendicular direction of the vibration damping device from being affected by contact of the stopper protrusion against the inner surface of the peripheral wall of the housing recess, and the target vibration damping performance can be effectively obtained.

As noted above, with the vibration damping device itself, while the stopper protrusion for limiting the amount of relative displacement of the first mounting member and the second mounting member is used to prevent the stopper member from falling out of the housing recess, when installed on a vehicle, etc., where there is no problem of the stopper member falling out of the housing recess, the target vibration damping performance is effectively demonstrated by positioning the stopper protrusion further inside the recess than the elastic tapered portion.

A second mode of this invention provides the vibration damping device according to the first mode, wherein the at least one elastic tapered portion comprises a plurality of elastic tapered portions that are arranged on a circumference of the housing recess at specific distances in a circumferential direction.

With the second mode, by the stopper protrusion and the elastic tapered portion in contact at multiple locations on the circumference, tilting of the stopper member by contact reaction force, etc., is prevented, and the stopper member is stably held in the housing recess in a predetermined direction. Compared to when a continuous elastic tapered portion is provided all around the circumference, the stopper protrusion can easily pass over the elastic tapered portions and be inserted into the housing recess, thus making the work of positioning the stopper member easy.

A third mode of this invention provides the vibration damping device according to the first or second mode, wherein the inner circumferential surface of the cylindrical portion is covered by a rubber sheath layer that is integrally formed with the main rubber elastic body, and the elastic tapered portion is integrally formed with the rubber sheath layer.

With the third mode, even when the plurality of elastic tapered portions are provided, those elastic tapered portions can be easily formed by being integrally formed with the rubber sheath layer. And, by integrally forming the rubber sheath layer with the main rubber elastic body, the rubber sheath layer and elastic tapered portions can be provided more easily and with a simpler structure.

A fourth mode of this invention provides the vibration damping device according to any one of the first to third modes, wherein the stopper member has a quadrangular tubular shape, and notches are provided in corners of the stopper member that open onto an axial end surface thereof.

With the fourth mode, concentration of the stress in the corners of the stopper member is avoided and improvement in the durability of the stopper member is achieved. Moreover, when the stopper member is formed by an elastic body such as rubber, it becomes possible to use the notches to adjust the characteristics of the stopper means that restricts the amount of relative displacement of the first mounting member and the second mounting member.

A fifth mode of this invention provides the vibration damping device according to any one of the first to fourth modes, wherein the stopper member has a quadrangular shape when viewed in the axial direction, the at least one stopper protrusion comprises a plurality of stopper protrusions that project outward from respective opposing sides of the stopper member, and circumferential ends of the stopper protrusions overlap the elastic tapered portion of the housing recess when viewed in axial direction projection.

With the fifth mode, the frictional resistance when the stopper protrusions pass over the elastic tapered portion is minimized and the stopper member can be easily inserted into the housing recess. Moreover, locking contact in the axial direction can be realized more efficiently by adopting and combining the structure described in the sixth mode (described later).

A sixth mode of this invention provides the vibration damping device according to any one of the first to fifth modes, wherein the housing recess has a quadrangular shape when viewed in the axial direction, and the at least one elastic tapered portion comprises a plurality of elastic tapered portions that are provided in respective corners of the housing recess.

With the sixth mode, by providing the elastic tapered portions in the corners of the housing recess, it is possible to prevent the sides of the housing recess from collapsing into the inner circumference due to the stopper protrusion being caught on the elastic tapered portions when the stopper member is inserted into the housing recess. Furthermore, by having the elastic tapered portions provided in the corners of the housing recess that have excellent shape stability, the locking contact of the stopper protrusion can effectively prevent the stopper member from falling out, even with the elastic tapered portions with a small circumferential length.

A seventh mode of this invention provides the vibration damping according to any one of the first to sixth modes, wherein a guide portion is provided on the inner circumferential surface of the housing recess that guides the stopper member in the axial direction.

With the seventh mode, with the guide portions guiding the stopper member in the axial direction when the stopper member is inserted into the housing recess, the stopper member can be easily positioned into the housing recess.

An eighth mode of this invention provides the vibration damping device according to any one of the first to seventh modes, wherein a dividing groove is formed on the stopper protrusion that opens onto a distal end surface thereof and extends in the axial direction.

With the eighth mode, because the dividing groove allows deformation of the elastic tapered portion and the stopper protrusion when the stopper protrusion passes over the elastic tapered portion, insertion of the stopper member into the housing recess is made easy.

With this invention, through locking contact in the axial direction of the elastic tapered portion of the housing recess and the stopper protrusion of the stopper member that overlap each other when viewed in axial direction projection, the stopper member is prevented from falling out of the housing recess and the stopper member is held stably in the housing recess. Moreover, when installed on a vehicle, etc., with the stopper member in a specific position within the housing recess, by positioning the stopper protrusion further inside the recess than the elastic tapered portion, the stopper protrusion is prevented from being pressed against the elastic tapered portion, thus reducing or avoiding the effect on the spring characteristics of the vibration damping device.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

The following describes an embodiment of this invention with reference to the drawings.

As one embodiment of a vibration damping device that has been given a structure in accordance with this invention, FIGS. 1 to 4 show an automotive engine mount 10. The engine mount 10 has a structure wherein a rubber stopper 14, which serves as the stopper member, is attached to a mount body 12 as the main body of the vibration damping device. In the following explanation, the "vertical direction" in principle refers to the up-down direction in FIG. 3, which is the axial direction. The "front-rear" direction refers to the left-right direction in FIG. 1, which equates to the vehicle front-rear direction in the installed state on the vehicle. The "left-right" direction refers to the vertical direction in FIG. 1, which equates to the vehicle left-right direction in the installed state on the vehicle.

In more detail, the mount body 12 has, as shown in FIGS. 5 to 8, a structure in which a first mounting member 16 and a second mounting member 18 are elastically connected by a main rubber elastic body 20.

The first mounting member 16 presents a rounded, substantially quadrangular shape when viewed in the axial direction, and is a highly rigid component formed by a plate of iron or aluminum alloy, etc. Its inner circumferential end and outer circumferential end both extend in the substantially axis-perpendicular direction, and its central portion in the axis-perpendicular direction is given a tapered shape that gradually opens upward. A bolt insertion hole 22, formed in the central part of the first mounting member 16, has a circular shape with a small diameter that penetrates vertically. The first mounting member 16 is configured to be attached to the power unit by bolting the rod member 23 of the power unit using the bolt insertion hole 22.

The second mounting member 18 is a highly rigid component made of metal, etc., just like the first mounting member 16, and is integrally equipped with a cylindrical portion 24, which extends in the axial direction and has a substantially quadrangular cross-section with its corners rounded in an arc shape, and a flange portion 26, which extends outward in the axis-perpendicular direction from the upper end of the cylindrical portion 24. The flange portion 26 projects further out in the front-rear direction than the left-right direction, and is penetrated by a bolt hole 28 on both the front and rear sides. This second mounting member 18 is configured to be attached to the vehicle body by overlapping the flange portion 26 on a mounting portion 29 of the vehicle body and using the bolt hole 28 to bolt them together.

The first mounting member 16 is separated from and positioned above the second mounting member 18, with the first mounting member 16 and the second mounting member 18 elastically connected by the main rubber elastic body 20. The main rubber elastic body 20 is given a substantially truncated quadrangular pyramid shape with rounded corners, the edge of its smaller diameter side is bonded by vulcanization to the bottom surface of the first mounting member 16, and the edge of its larger diameter side is bonded by vulcanization to the upper end of the cylindrical portion 24 of the second mounting member 18 and to the flange portion 26. The main rubber elastic body 20 is thus formed as an integrally vulcanization molded component equipped with the first mounting member 16 and the second mounting member 18.

Furthermore, a downward opening recess is formed in the main rubber elastic body 20, and faces downward through the cylindrical portion 24 of the second mounting member 18. Through this, a housing recess 30, a portion of whose wall is constituted by the main rubber elastic body 20 and which has a substantially quadrangular shape when viewed in the axial direction, is formed at the inner circumference of the cylindrical portion 24 and opens downward in the axial direction. In addition, with this embodiment, the main rubber elastic body 20 is not fixed to the central portion of the first mounting member 16, but the bolt insertion hole 22 of the first mounting member 16 is connected to the housing recess 30 through the center hole in the main rubber elastic body 20. The rod member 23, which is inserted into the housing recess 30, is bolted into the bolt insertion hole 22 on the first mounting member 16.

A rubber sheath layer 32 is fixed to the cylindrical portion 24 of the second mounting member 18. The rubber sheath layer 32 is integrally formed with the main rubber elastic body 20, and, with this embodiment, in addition to the inner circumferential surface of the cylindrical portion 24, the rubber sheath layer 32 also covers the axial end surface and outer circumferential surface of the cylindrical portion 24. Through this, the inner surface of the peripheral wall of the housing recess 30 is integrally composed of the main rubber elastic body 20 and the rubber sheath layer 32.

Guide protrusions 34 are also provided as a guide portion on the inner surface of the peripheral wall of the housing recess 30, which is composed of the main rubber elastic body 20 and the rubber sheath layer 32. Each guide protrusion 34 extends in a substantially unchanging semicircular cross-section in the axial direction from the open end of the housing recess 30 and the guide protrusions 34 are formed in pairs at portions facing in the axis-perpendicular direction on the peripheral wall of the housing recess 30. The guide protrusions 34, 34 in each pair are formed and separated in the circumferential direction only by a distance corresponding to the width of the guide projection 38 on the rubber stopper 14 (described later).

The separate rubber stopper 14 is attached to the mount body 12, which is provided with the above-mentioned structure. As shown in FIGS. 9 to 13, the rubber stopper 14 is integrally formed overall as an elastic rubber body and has an inverted, substantially quadrangular tubular shape with a bottom. A rod insertion hole 36, which passes through vertically, is formed on the upper bottom wall, and the rod member 23 is inserted therethrough. Although it is desirable that the stopper member is made of an elastic rubber body or an elastic elastomer body, etc., reinforcing material that is made, for example, of metal or a rigid synthetic resin may be embedded inside, and the overall stopper member can be made more rigid.

A pair of guide projections 38 are also provided on the rubber stopper 14. The guide projections 38 protrude outward from sides opposing in one direction (left-right direction) of the rubber stopper 14, and continue in the axial direction with a specific width in the circumferential direction.

Figure 13:
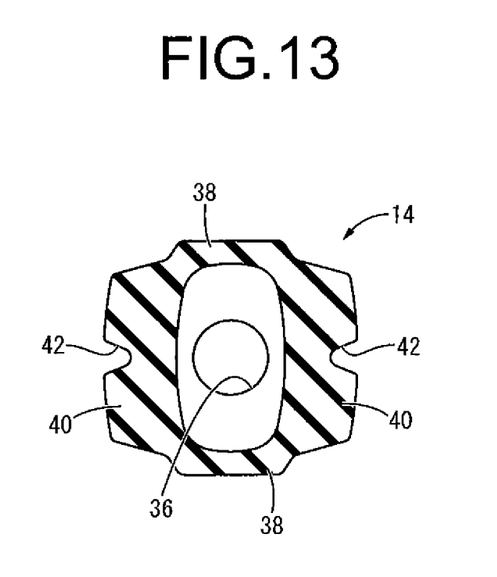
FIG. 13 is a cross sectional view taken along line 13-13 of FIG. 11.

A pair of stopper protrusions 40 are also provided on the rubber stopper 14. The stopper protrusions 40 project outward in the front-rear direction from sides opposing in the other direction (front-rear direction) at the top of the rubber stopper 14. With this embodiment, their width narrows vertically toward the projecting tip. Dividing grooves 42 are formed opening onto the projecting distal end surface of the stopper protrusions 40 and extend in the axial direction, so that the projecting tips of the stopper protrusions 40 are divided into two sections to both sides of the dividing grooves 42 in the circumferential direction. As shown in FIG. 13, the dividing grooves 42 in this embodiment have a groove sectional shape with a width that increases toward the projecting tips of the stopper protrusions 40.

With this embodiment, the main body of the rubber stopper 14 except for the guide projections 38 and the stopper protrusions 40 has a substantially rectangular external form when viewed in the axial direction. While the pair of guide projections 38 protrude from sides opposing in the long-side direction of the rubber stopper 14, the pair of stopper protrusions 40 project from sides opposing in the short-side direction. The protruding dimension of the stopper protrusions 40 is greater than that of the guide projections 38, so that the rubber stopper 14 is thicker in the axis-perpendicular direction where the stopper protrusions 40 are provided.

Furthermore, a notch 44 that opens downward in the axial direction is formed at each corner of the rubber stopper 14. The notch 44 in this embodiment has a smooth, curved inner surface, so the concentration of the stress on the inner surface of the notch 44 is eased during deformation of the rubber stopper 14.

Figure 1:
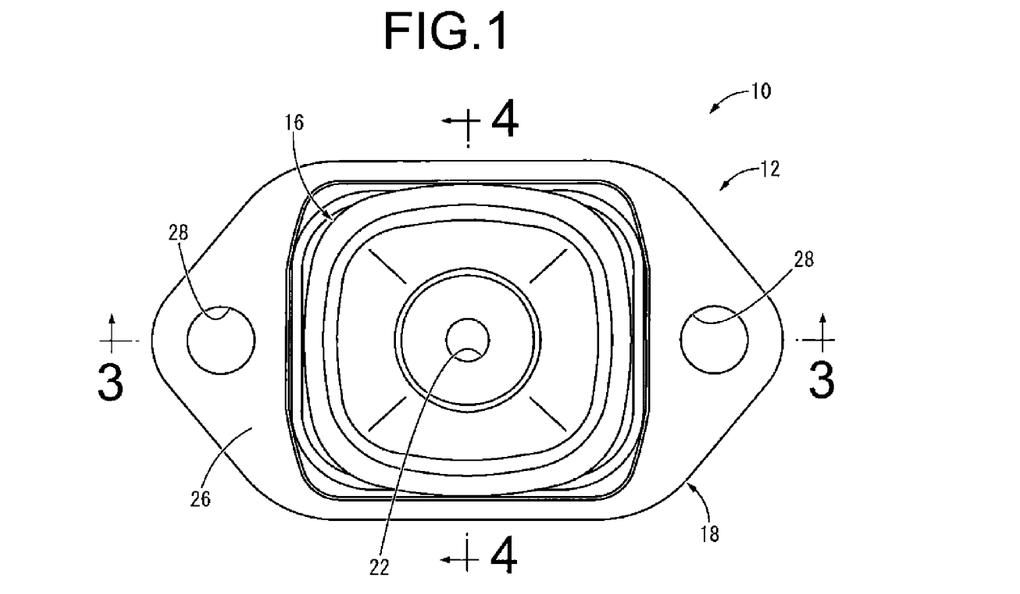
FIG. 1 is a plan view of a vibration damping device in the form of an engine mount as an embodiment of this invention.
Figure 2:
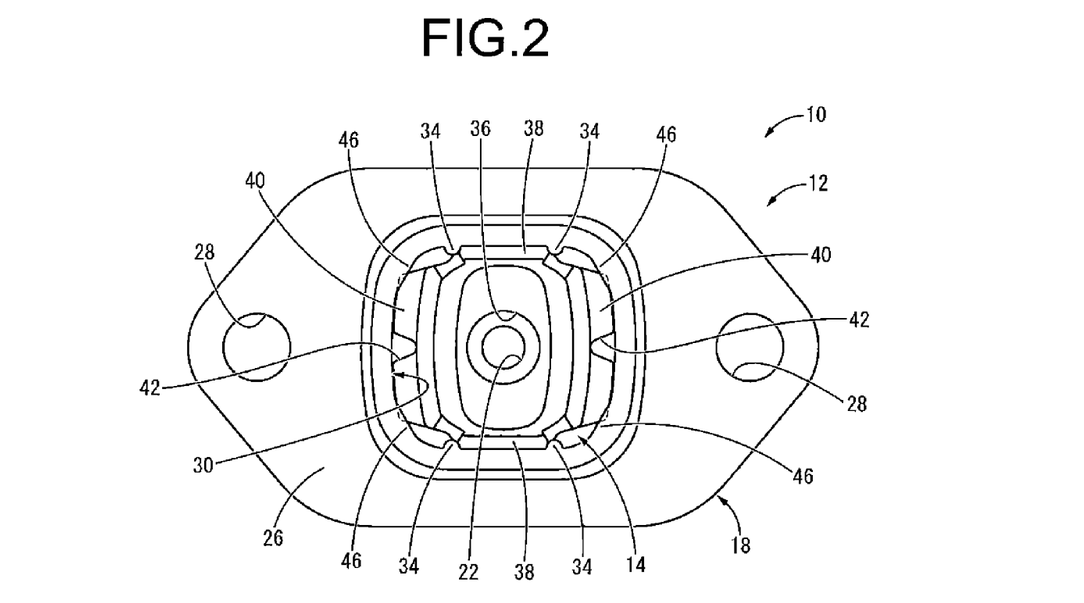
FIG. 2 is a bottom view of the engine mount shown in FIG. 1.
Figure 3:
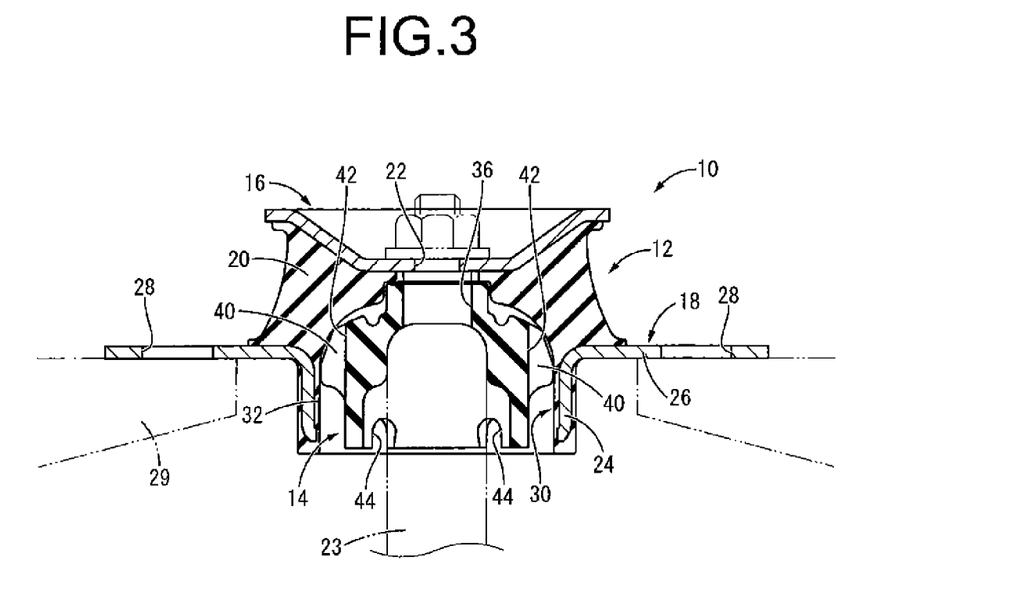
FIG. 3 is a cross sectional view taken along line 3-3 of FIG. 1.
Figure 4:
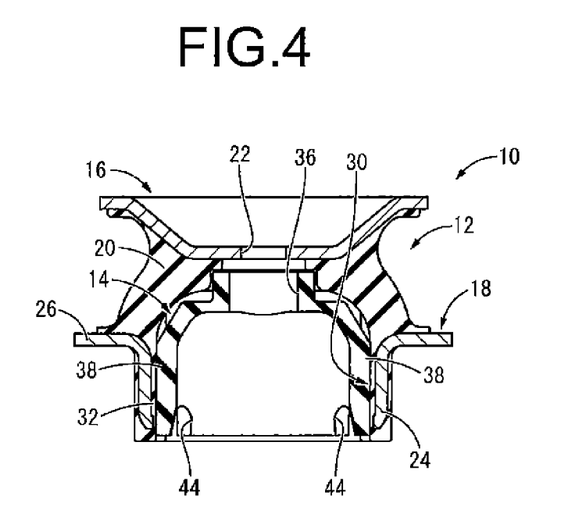
FIG. 4 is a cross sectional view taken along line 4-4 of FIG. 1.
Figure 5:
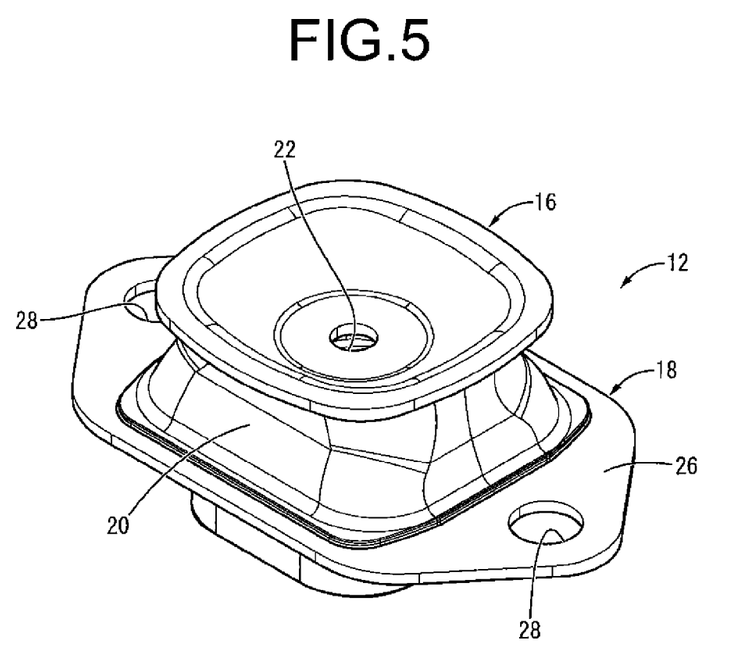
FIG. 5 is a perspective view of a mount body of the engine mount shown in FIG. 1.
Figure 6:
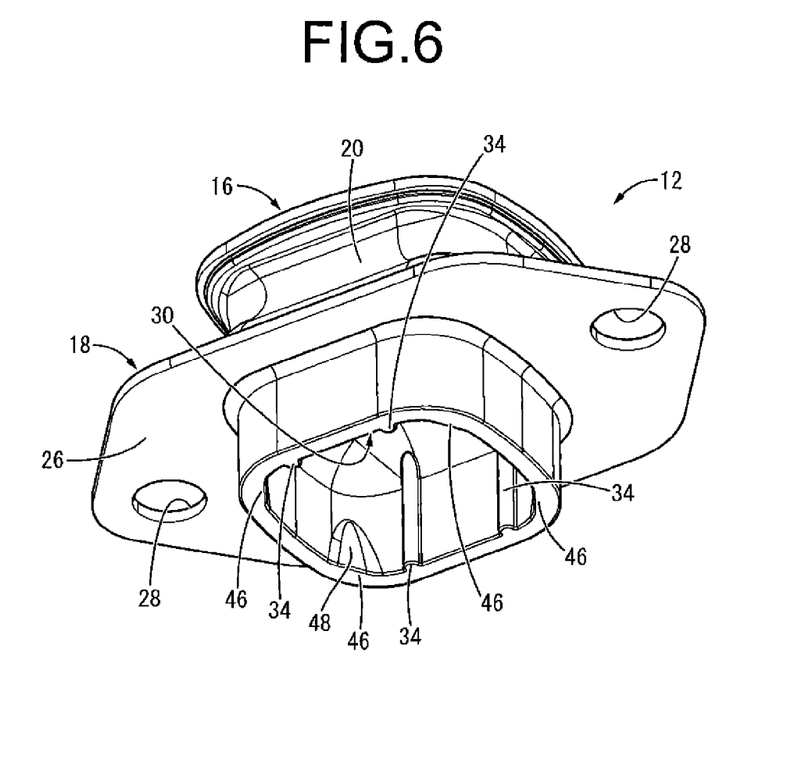
FIG. 6 is a perspective view of the mount body shown in FIG. 5 from a different angle.
Figure 7:
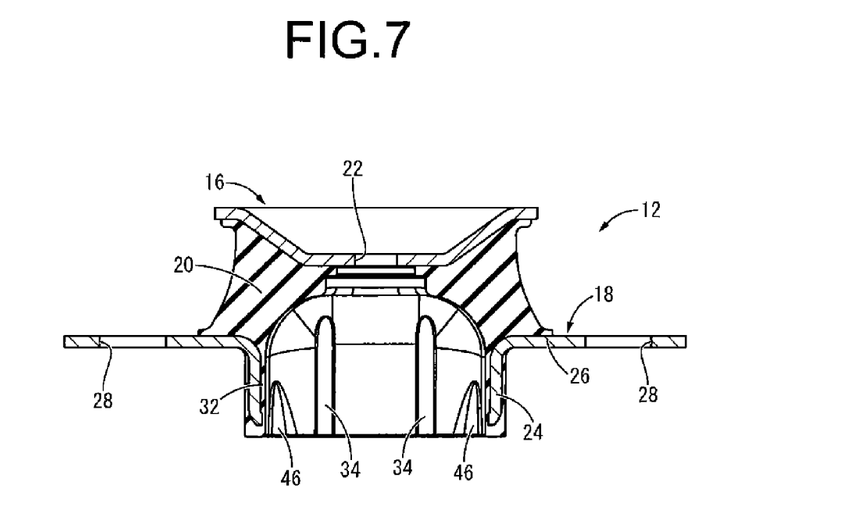
FIG. 7 is a longitudinal cross-sectional view of the mount body shown in FIG. 5, taken along line 7-7 of FIG. 8.
Figure 8:
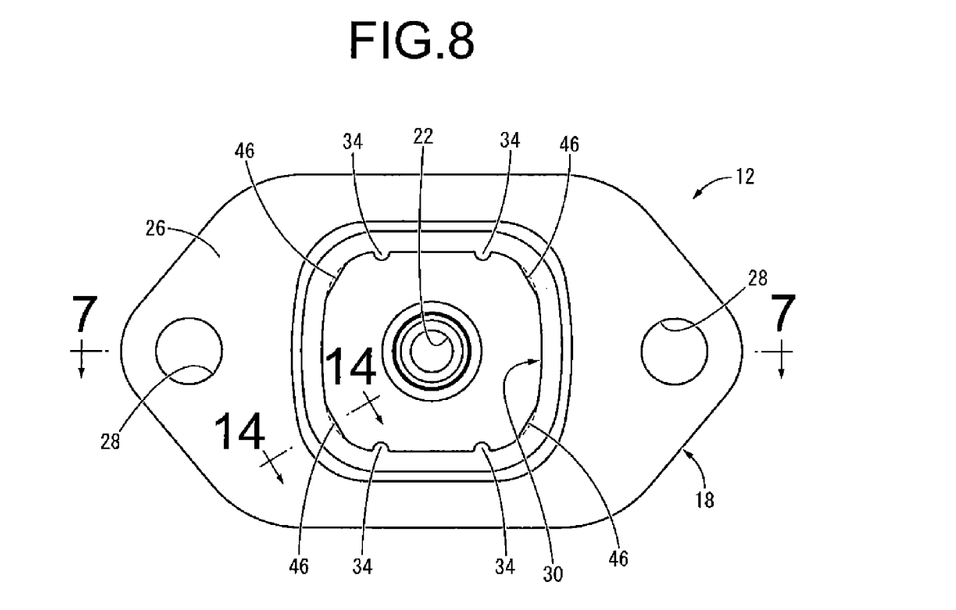
FIG. 8 is a bottom view of the mount body shown in FIG. 7.
Figure 9:
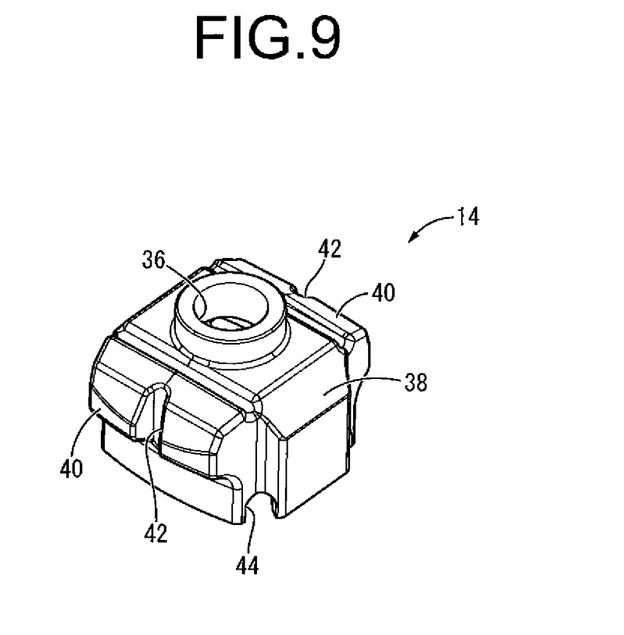
FIG. 9 is a perspective view of a rubber stopper of the engine mount shown in FIG. 1.
Figure 10:
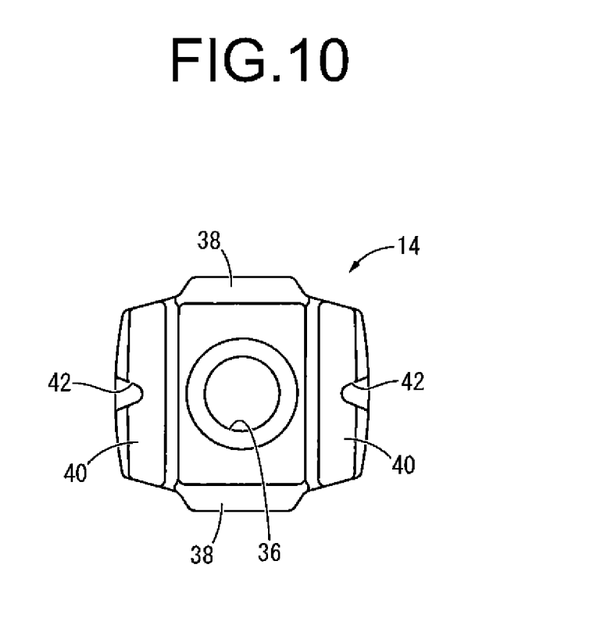
FIG. 10 is a plan view of the rubber stopper shown in FIG. 9.
Figure 11:
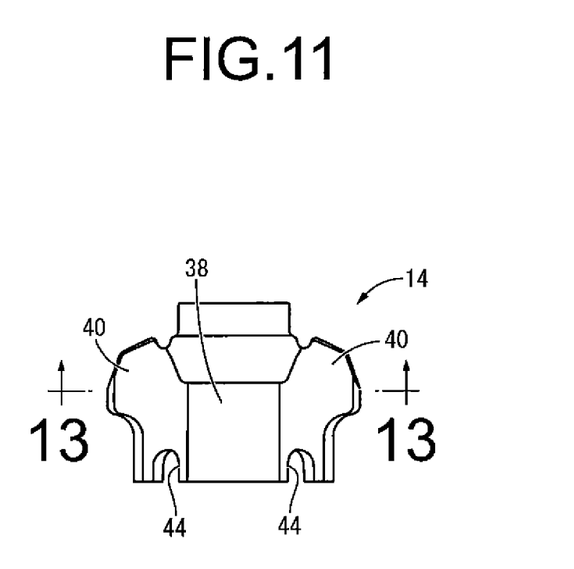
FIG. 11 is a front view of the rubber stopper shown in FIG. 9.
Figure 12:
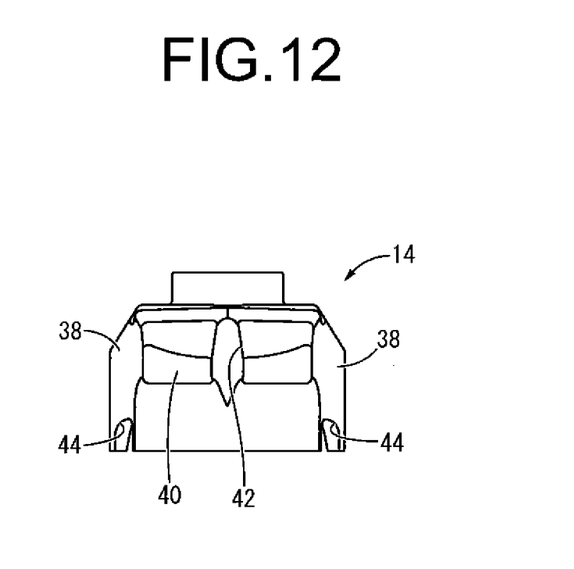
FIG. 12 is a right-side view of the rubber stopper shown in FIG. 9.

With this type of structure, the rubber stopper 14 is, as shown in FIGS. 2 to 4, inserted and positioned in the housing recess 30 of the mount body 12 from below. With this embodiment, by inserting each guide projection 38 provided on the rubber stopper 14 between the pair of guide protrusions 34 that are provided on the inner circumferential surface of the housing recess 30, the rubber stopper 14 is guided in the axial direction along those guide protrusions 34.

With this embodiment, by inserting the rubber stopper 14 into the housing recess 30, the pair of guide projections 38 are pressed against the inner surface of the peripheral wall of the housing recess 30, and the rubber stopper 14 is held in the housing recess 30 through the frictional resistance force that acts between this pair of guide projections 38 and the inner surface of the peripheral wall of the housing recess 30.

Figure 14:
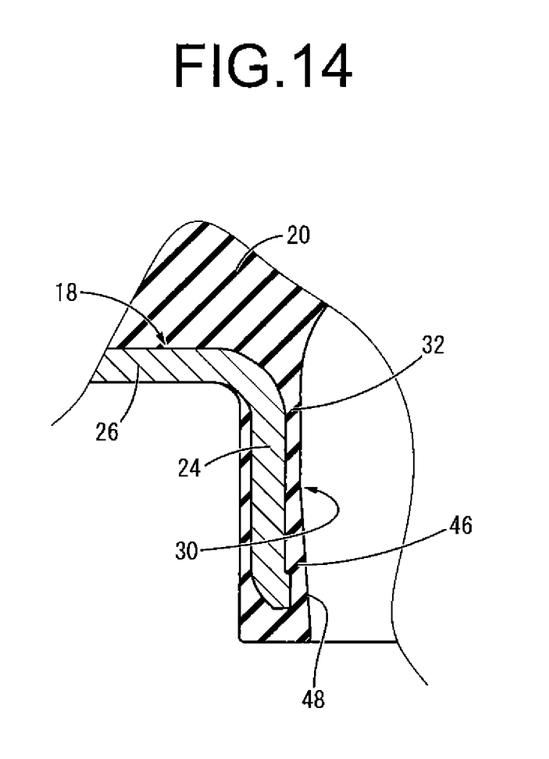
FIG. 14 is a cross sectional view taken along line 14-14 of FIG. 8.

Here, the means is provided to prevent the rubber stopper 14 from falling out of the housing recess 30. That is, four elastic tapered portions 46 are formed on the inner surface of the peripheral wall of the housing recess 30. As shown in FIG. 14, the elastic tapered portions 46 are integrally formed with the rubber sheath layer 32 so as to be provided at the opening of the housing recess 30, and are equipped with contact surfaces 48 that gradually incline to the inner circumferential side towards the open side of the housing recess 30. With this embodiment, by gradually making the elastic tapered portions 46, which are provided on the inner circumferential surface of the cylindrical portion 24 of the second mounting member 18, thicker toward the open side of the housing recess 30, the inner circumferential surface of the elastic tapered portions 46 serves as the contact surface 48.

Furthermore, with this embodiment, the elastic tapered portions 46 are, as shown in FIG. 2, provided at the respective four corners of the housing recess 30. These four elastic tapered portions 46 are separated and distributed at specific distances in the circumferential direction. As also shown in FIG. 2, the elastic tapered portions 46 that are arranged on circumferentially both sides of another elastic tapered portion 46 are situated in opposing positions, front-rear or left-right.

While the base end of each elastic tapered portions 46 at the bottom (inside) of the housing recess 30 is located on the inner circumferential surface of the cylindrical portion 24 of the second mounting member 18, the tip end on the open side of the housing recess 30 extends further outward in the axial direction than the cylindrical portion 24. Through this, while the base ends of the elastic tapered portions 46 are restrained by the cylindrical portion 24 and their elastic deformation to the outer circumference is limited, for the tip ends, elastic deformation to the outer circumference is allowed.

Figure 15A:
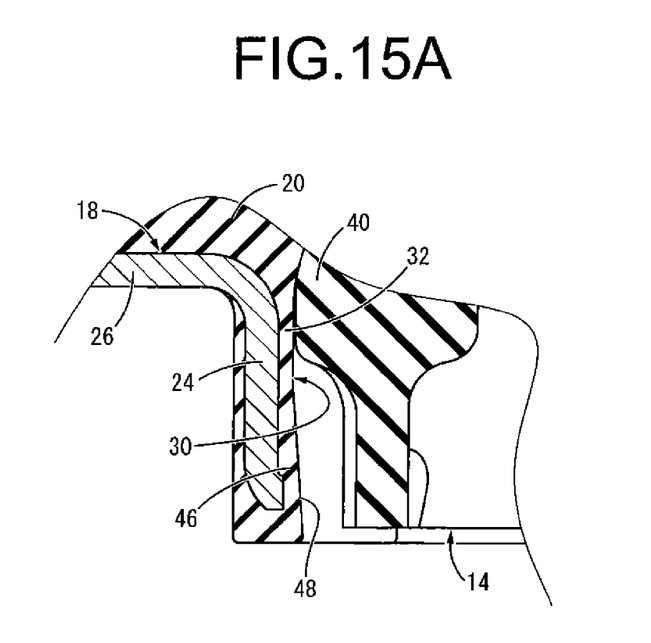
FIGS. 15A and 15B are enlarged longitudinal cross-sectional views of a principle part of the engine mount shown in FIG. 1, wherein FIG. 15A indicates the state where the rubber stopper is situated in a predetermined position in a housing recess, and FIG. 15B indicates the state where an elastic tapered portion prevents the rubber stopper from falling out of the housing recess.

On the rubber stopper 14, as shown in FIG. 15A, the stopper protrusions 40 pass over the elastic tapered portions 46 when inserted inside the housing recess 30, and the stopper protrusions 40 are thus situated independently from and above the elastic tapered portions 46.

With this embodiment, the corners on circumferentially both sides of each stopper protrusion 40 are pressed against the elastic tapered portions 46, and are made to pass over those elastic tapered portions 46. The contact surface area is minimized when the protrusions pass over those elastic tapered portions 46 and frictional resistance is reduced. Furthermore, because the dividing grooves 42 are formed in the stopper protrusions 40 that open on its distal end surface and extend in the axial direction, elastic deformation of the stopper protrusions 40 is allowed to the circumferentially center side, and the corners can easily pass over the elastic tapered portions 46.

Figure 15B:
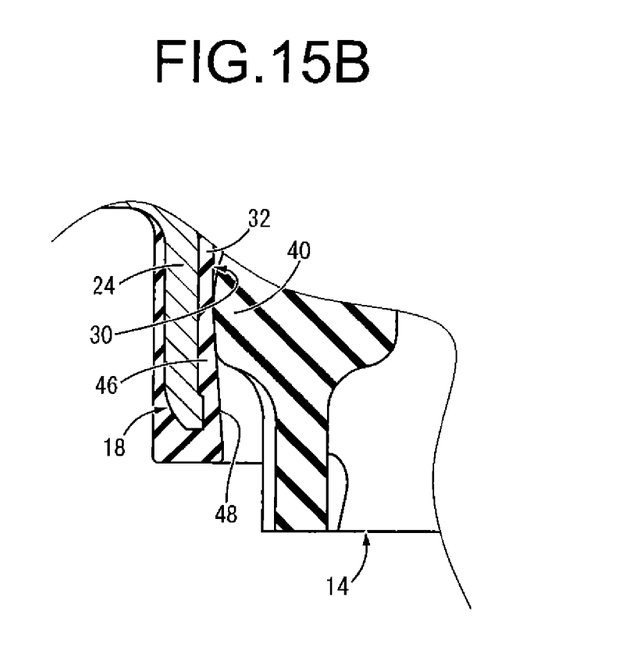

In this way, by inserting the stopper protrusions 40 further inside the housing recess 30 than the elastic tapered portions 46, as shown in FIG. 2, the corners at circumferentially both sides of the stopper protrusions 40 overlap the elastic tapered portions 46 when viewed in axial direction projection. As a result, if an external force acts on the rubber stopper 14 in the direction (downward) of falling out of the opening in the housing recess 30, as shown in FIG. 15B, because the corners of the stopper protrusions 40 are in locking contact in the axial direction with each contact surface 48 of the elastic tapered portions 46, and the relative displacement of the rubber stopper 14 to the mount body 12 is limited, thereby preventing the rubber stopper 14 from falling out of the housing recess 30.

Especially, because the corners of the stopper protrusions 40 are placed in contact with the contact surface 48 at the base edge of the elastic tapered portions 46, which are fixed to the inner circumferential surface of the cylindrical portion 24, the elastic deformation of the elastic tapered portions 46 by that contact with the stopper protrusions 40 is limited. The rubber stopper 14 is, in this way, more effectively prevented from falling out of the housing recess 30.

Also, because the elastic tapered portions 46 are provided in the four corners of the housing recess 30 whose shapes are stably retained, even if the elastic tapered portions 46 are formed with a comparatively short length in the circumferential direction, deformation is easily limited and the rubber stopper 14 can be advantageously prevented from falling out of the housing recess 30. In addition, though the elastic tapered portions 46 become undercuts when downwardly extracting the mold after forming the surface of the inner wall of the housing recess 30, because each elastic tapered portion 46 is distributed around the circumference with a short circumferential length, removal of that mold is made easy.

Furthermore, because the four elastic tapered portions 46 are provided so as to be distributed on the circumference of the housing recess 30, the contact surface 48 of each elastic tapered portion 46 comes in contact with circumferentially both corners of the stopper protrusions 40. Through this, because the reaction force from the contact of the elastic tapered portions 46 and the stopper protrusions 40 acts on the rubber stopper 14 with sufficient balance on the circumference, tilting of the rubber stopper 14 is also prevented and the rubber stopper 14 is held in the housing recess 30 in the specified direction.

In particular, with this embodiment, because the four elastic tapered portions 46 are mutually connected by being integrally formed with the rubber sheath layer 32, each elastic tapered portion 46 is firmly fixed to the cylindrical portion 24 and is easily molded. Furthermore, because the rubber sheath layer 32 is integrally formed with the main rubber elastic body 20, it becomes possible to easily integrally form the main rubber elastic body 20, the rubber sheath layer 32 and the four elastic tapered portions 46 together.

Moreover, when installed on a vehicle as shown hypothetically in FIG. 3, the stopper protrusions 40 are position further inside the housing recess 30 than the elastic tapered portions 46 as also shown in FIG. 15A, and are separated without being forcefully pressed against the inner surface of the peripheral wall of the housing recess 30 or in contact with only zero or slight contact pressure. Through this, the effect of the spring in the rubber stopper 14 on the spring characteristics of the mount body 12 is reduced in relation to input of a small amplitude vibration in the axis-perpendicular direction, and by obtaining the target spring characteristics (low dynamic spring characteristics), an effective vibration damping effect (vibration isolation effect) is demonstrated.

In addition, because the lower portion of the rubber stopper 14 that is separated from the stopper protrusions 40 is formed with a sufficiently small external form in the front-rear direction in comparison with the internal dimensions of the opening of the housing recess 30, by positioning the stopper protrusions 40 further inside the housing recess 30 than the elastic tapered portions 46, contact between the rubber stopper 14 and the elastic tapered portions 46 is avoided.

Moreover, when installed on a vehicle as shown hypothetically in FIG. 3, if a large load caused by the acceleration and deceleration of the vehicle, etc., is applied in the front-rear direction (the left-right direction in FIG. 3), the stopper protrusions 40 of the rubber stopper 14, which is fitted externally onto the rod member 23, are pressed against the inner circumferential surface of the housing recess 30, and the amount of relative displacement of the first mounting member 16 and the second mounting member 18 in the axis-perpendicular direction is limited. Through this, any excessive elastic deformation of the main rubber elastic body 20 is prevented and improvement is achieved in the durability of the main rubber elastic body 20. With this embodiment, by forming the dividing grooves 42 in the projecting tip of the stopper protrusions 40, the spring at the projecting tip of the stopper protrusions 40 is minimized. Thus, the shock when the stopper protrusions 40 contact the inner circumferential surface of the housing recess 30 is eased, and any striking noise is reduced.

Especially with this embodiment, giving the stopper protrusions 40 a tapered tip enables a more shock-absorbing stopper action to be obtained.

An embodiment of this invention is described in detail above, but this invention is not limited to this concrete description. For example, the elastic tapered portions need not necessarily be formed in plurality; only one is sufficient. Concretely, for example, one elastic tapered portion may be provided continuously all around the circumference.

Moreover, the position where the elastic tapered portions are formed in the depth direction of the housing recess does not need to be limited to the open edge of the housing recess, but may be in the central portion in the depth direction of the housing recess. In addition, the elastic tapered portion may be situated so as to overlap the cylindrical portion in its entirety when viewed in axis-perpendicular direction projection.

The elastic tapered portions do not necessarily need to be formed in the corners of the housing recess; they may also be provided on the sides of the housing recess. As is also clear from this, the circumferentially central portion of the stopper protrusions may also overlap the elastic tapered portions when viewed in axial direction projection.

The elastic tapered portions are not limited to the structure in the above-mentioned embodiment, wherein they are formed by an elastic rubber body that is gradually thicker toward the open side of the housing recess. For example, they can also be provided by drawing operation etc. of the bottom of the cylindrical portion so as to make a slanted shape that inclines inward towards the bottom.

The housing recess is not limited to being quadrangular in shape when viewed in the axial direction but may be circular. Moreover, for the stopper member, for example, a cylindrical or other shape may be employed. It is desirable for the shape of the housing recess and stopper member when viewed in the axial direction to substantially correspond to each other, but it is also possible to use mutually different forms for the shape of the housing recess and stopper member when viewed in the axial direction. For example, a cylindrical stopper member may be positioned in a housing recess that is quadrangular in shape when viewed in the axial direction.

Although the stopper member is formed overall with an elastic rubber body in the above-mentioned embodiment, in order, for example, to aim at a more stabilized form and improved load bearing characteristics, etc., rigid reinforcing components made of metal or a synthetic resin may be embedded inside.

The scope of this invention is not limited to an engine mount, and may also be applied to a vibration damping device used as a subframe mount, a body mount, a differential mount, etc. Moreover, this invention does not apply only to a vibration damping device for automobiles but, for example, may also be applied to vibration damping devices used on motorcycles, rolling stock for railways, industrial vehicles, etc.

What is claimed is:
1. A vibration damping device comprising:
a first mounting member;
a second mounting member having a cylindrical portion;
a main rubber elastic body elastically connecting the first and second mounting members; and
a separate stopper member positioned in a housing recess that is formed by the cylindrical portion of the second mounting member and that opens in an axial direction, wherein
the housing recess has a quadrangular shape as viewed in the axial direction, and an elastic tapered portion that is equipped with a contact surface that inclines gradually to an inner circumferential side while extending from a central portion in the axial direction of the cylindrical portion which constitutes a peripheral wall of the housing recess toward an open side of the housing recess is provided in each corner of the housing recess, the stopper member has a quadrangular shape as viewed in the axial direction, and a pair of stopper protrusions projecting from a pair of opposing sides of the stopper member outward in an axis-perpendicular direction is provided to the pair of opposing sides, and each of the stopper protrusions is positioned at a further bottom wall side in an axial direction of the housing recess than the elastic tapered portion, and a circumferential edge of a tip end portion of each of the stopper protrusions at the open side of the housing recess is in locking contact in the axial direction with the elastic tapered portion so as to prevent the stopper member from falling out of the housing recess.

2. The vibration damping device according to claim 1, wherein the inner circumferential surface of the cylindrical portion is covered by a rubber sheath layer that is integrally formed with the main rubber elastic body, and the elastic tapered portion is integrally formed with the rubber sheath layer.

3. The vibration damping device according to claim 1, wherein the stopper member has a quadrangular tubular shape, and notches are provided in corners of the stopper member that open onto an axial end surface thereof.

4. The vibration damping device according to claim 1, wherein circumferential ends of the stopper protrusions overlap the elastic tapered portion of the housing recess as viewed in the axial direction.

5. The vibration damping device according to claim 1, wherein a guide portion is provided on the inner circumferential surface of the housing recess that guides the stopper member in the axial direction.

6. The vibration damping device according to claim 1, wherein a dividing groove is formed on each stopper protrusion that opens onto a distal end surface thereof and extends in the axial direction.

\* \* \* \* \*